(12) United States Patent
Pitts

(10) Patent No.: US 11,718,405 B1
(45) Date of Patent: Aug. 8, 2023

(54) RETRACTABLE LUG AND METHODS FOR PROJECTILE COUPLING AND DECOUPLING

(71) Applicant: Generation Orbit Launch Services, Inc., Atlanta, GA (US)

(72) Inventor: Zachary Pitts, Avondale Estates, GA (US)

(73) Assignee: Generation Orbit Launch Services, Inc., Atlanta, GA (US)

( * ) Notice: Subject to any disclaimer, the term of this patent is extended or adjusted under 35 U.S.C. 154(b) by 630 days.

(21) Appl. No.: 16/787,728

(22) Filed: Feb. 11, 2020

(51) Int. Cl.
*B64D 7/00* (2006.01)

(52) U.S. Cl.
CPC ...................................... *B64D 7/00* (2013.01)

(58) Field of Classification Search
CPC ..... B64D 7/00; B64D 1/06; F41F 3/065; F41F 3/06; F41F 5/00; B64D 1/00; B64D 1/02; B64D 1/04
See application file for complete search history.

(56) References Cited

U.S. PATENT DOCUMENTS

| | | | | |
|---|---|---|---|---|
| 2,532,743 | A * | 12/1950 | Storch | B64D 9/00 105/422 |
| 2,570,818 | A * | 10/1951 | Whitener et al. | B64D 37/005 220/293 |
| 2,852,981 | A * | 9/1958 | Caya | F42B 10/38 294/82.26 |
| 3,195,406 | A * | 7/1965 | Toomey, Jr. | F42B 10/38 89/1.819 |
| 3,379,131 | A * | 4/1968 | Webb | F42B 25/00 89/1.51 |
| 4,917,526 | A * | 4/1990 | Paterson | F16C 11/04 403/93 |
| 5,056,408 | A * | 10/1991 | Joner et al. | F42B 25/00 89/1.819 |
| 5,094,140 | A * | 3/1992 | Williams | B64D 7/08 89/1.819 |
| 5,961,075 | A * | 10/1999 | Russell, III | B64D 1/04 89/1.51 |
| 6,634,599 | B2 * | 10/2003 | Griffin | B64D 1/04 244/137.4 |

(Continued)

*Primary Examiner* — Benjamin P Lee
(74) *Attorney, Agent, or Firm* — Morris, Manning & Martin LLP; Daniel E. Sineway, Esq.; Adam J. Thompson, Esq.

(57) ABSTRACT

A lug assembly can include a frame, lug base, lug, and door. The lug assembly can be attached to a projectile that can be coupled and decoupled to an aircraft via the lug assembly. The frame can slidably receive the door. The lug can connect to the lug base and rotate thereabout from a first lug position to a second lug position upon the projectile decoupling. In the second lug position, the lug is contained within the frame such that an aerodynamic profile of the projectile is preserved. The door can connect to the lug base via a closing mechanism including one or more tension mechanism that apply a closing force to the door. Upon the projectile decoupling, the closing force causes the door to slide from a first to a second position, the door transitioning the lug to the second lug position and substantially sealing the frame opening.

20 Claims, 8 Drawing Sheets

(56) References Cited

U.S. PATENT DOCUMENTS

| | | | | |
|---|---|---|---|---|
| 6,880,780 | B1* | 4/2005 | Perry et al. | F42B 10/14 244/49 |
| 7,690,304 | B2* | 4/2010 | Roemerman et al. | F42C 15/005 89/1.55 |
| 7,895,946 | B2* | 3/2011 | Roemerman et al. | F42B 25/00 244/3.17 |
| 8,541,724 | B2* | 9/2013 | Roemerman | F42B 12/04 359/709 |
| 8,584,987 | B2* | 11/2013 | Madsen et al. | C22C 19/03 244/130 |
| 2007/0095978 | A1* | 5/2007 | Oetken et al. | B64D 9/003 244/118.1 |
| 2009/0107324 | A1* | 4/2009 | Bar-On et al. | F16B 35/06 29/592 |
| 2010/0326264 | A1* | 12/2010 | Roemerman et al. | B64D 1/06 89/1.56 |
| 2020/0164984 | A1* | 5/2020 | Keller et al. | B64D 1/04 |
| 2022/0212795 | A1* | 7/2022 | Remy | B64D 1/12 |

* cited by examiner

RETRACTABLE LUG AND METHODS FOR PROJECTILE COUPLING AND DECOUPLING

STATEMENT REGARDING FEDERALLY SPONSORED RESEARCH OR DEVELOPMENT

This invention was made with government support under No. FA8650-17-C-2414 awarded by the Air Force Research Lab. The government has certain rights in the invention.

TECHNICAL FIELD

The present apparatuses, assemblies, and methods relate generally to coupling and decoupling objects to and from larger objects, such as an aircraft.

BACKGROUND

Previous approaches to coupling and decoupling projectiles to and from larger objects, such as aircrafts, watercrafts, land vehicles, and other large objects, have relied on static lugs that permanently project outward from the projectile. While the previous lugs allow the projectile to be coupled and decoupled from aircraft, the static outward projection of the lugs can increase the aerodynamic profile of the projectile upon decoupling from the aircraft. Projectiles can travel at speeds in excess of Mach 5 and, at such speeds, protrusions from the projectile can generate significant heating and drag, thereby slowing the projectile. Furthermore, the protrusions can generate excessive heat that can melt the static lugs and portions of the projectile, rendering the projectile inoperable. The melted lug material can cause damage to other portions of the projectile when the melted lug material drips into the projectile, such as onto circuit boards or mechanical components.

Therefore, there is a long-felt but unresolved need for a device, apparatuses, or method that allows for a projectile to be coupled and decoupled to and from an aircraft, and also preserves the aerodynamic profile of the projectile upon decoupling from the aircraft.

BRIEF SUMMARY OF THE DISCLOSURE

Briefly described, and according to one embodiment, aspects of the present disclosure generally relate to apparatuses, assemblies, and methods for coupling and decoupling projectiles to and from larger objects such as aircrafts, watercrafts, land vehicles, and other large objects. Although the terms "aircraft" and "airplane" are used for exemplary purposes, it can be appreciated that the lug assemblies as described herein can be used with watercrafts, land vehicles, satellites, projectiles, and other large objects.

According to one embodiment, provided herein is a lug assembly for coupling and decoupling a projectile or other object to and from an aircraft. As described herein, unlike previous approaches, the lug assembly advantageously allows for preservation of an aerodynamic profile of a projectile upon the projectile being decoupled from an aircraft. In at least one embodiment, the lug assembly can include materials including, but not limited to, aluminum, steel and titanium. In one embodiment, the lug assembly may include only aluminum or only titanium or only steel material. The lug assembly can be fabricated to a particular mass that is equal to a mass of previous lug assemblies, thereby advantageously allowing for easy replacement of previous systems or devices utilized to couple and decouple a projectile to an aircraft.

The lug assembly can include a frame, and the lug assembly can be attached to a projectile such that the frame does not project outward from a surface of the projectile. The frame can include a lug base, and a lug can be configured in the lug base such that, when the projectile is decoupled from the aircraft, the lug can freely rotate from a first lug position to a second lug position. When the lug rotates to the second position, the lug may not project outward from the surface of the projectile and, thus, an aerodynamic profile of the projectile can be preserved.

The frame can include channels for slidably receiving a door. A closing mechanism can be connected to the door and the lug base. The closing mechanism can apply a closing force to the door causing the door to slide through the channels. The door can slide through the channels from an open position to an intermediate position and from the intermediate position to a closed position. In the open position, the door may not be in contact with a side surface of the lug. In the intermediate position, the door may be tangent to and in conflict with the side surface of the lug. While in contact with the side surface of the lug, the closing force can cause the door to apply a force to the lug. Upon the projectile decoupling from the aircraft, the applied force can cause the lug to rotate about the lug base from the first lug position to the second lug position. Upon the lug rotating to the second lug position, the closing force can cause the door to slide further through the channels, thereby transitioning the door to the closed position. In the closed position, the door can substantially seal the frame opening, thereby reducing presence of surfaces and protrusions that could compromise the aerodynamic profile of the projectile (e.g., due to generation of frictional forces that cause drag and/or deformation of the lug assembly and projectile).

According to a first aspect, an apparatus for attachment of a projectile to a body and release of the projectile from the body comprising: A) a frame comprising a frame body and a frame opening; B) a lug base; C) a lug configured to pivot about a pin in the lug base; D) a door connected to the frame; D) one or more tension mechanisms comprising a first spring end and a second spring end, the first spring end operatively connected to the lug base and the second spring end operatively connected to the door, wherein the one or more tension mechanisms are configured to be more extended when the door is open than when the door is closed; and E) a locking mechanism configured to restrict movement of the door in a first direction once the door moves in a second direction past a predetermined point, the first direction being opposite the second direction.

According to a second aspect, the apparatus of the first aspect or any other aspect, wherein the lug comprises a first lug portion integrally connected to a first end of a second lug portion and a second end of the second lug portion configured to be coupled to the lug base, the first lug portion comprising a substantially U-shaped body.

According to a third aspect, the apparatus of the second aspect or any other aspect, wherein the first lug portion is integrally connected to the first end of the second lug portion at a first end, and a depth of the first end of the first lug portion exceeds a depth of a second end of the first lug portion.

According to a fourth aspect, the apparatus of the second aspect or any other aspect, wherein the second lug portion comprises a substantially half-rectangular body comprising a first leg and a second leg and the lug base comprises a substantially half-rectangular body comprising a third leg and a fourth leg.

According to a fifth aspect, the apparatus of the fourth aspect or any other aspect, wherein the third leg and fourth leg each comprise a lug stop that determines a maximum rotation of the lug from a first lug position to a second lug position.

According to a sixth aspect, the apparatus of the second aspect or any other aspect, wherein the frame further comprises a first end portion, a second end portion, a first side portion, and a second side portion, a first end portion being operatively connected to a first end of the first side portion and a first end of a second side portion, and the second end portion being operatively coupled to a second end of the first side portion and a second end of the second side portion, wherein the first side portion, the second side portion, the first end portion, and the second end portion comprise the frame opening.

According to a seventh aspect, the apparatus of the first aspect or any other aspect, wherein the locking mechanism comprises a pawl and a rack, the pawl operatively connected to the door and the rack operatively connected to the lug base.

According to an eighth aspect, the apparatus of the first aspect or any other aspect, wherein the door comprises a top surface of the frame that is tangential to the lug when open and substantially seals the frame opening when closed, and further wherein the door is configured to push against and slide over the lug when transitioning from open to closed.

According to a ninth aspect, the apparatus of the first aspect or any other aspect, further comprising: A) a first lug mechanism comprising the frame, the lug base, the lug, the door, and the one or more tension mechanisms; and B) a second lug mechanism comprising a second frame, a second lug base, a second lug, a second door, and a second one or more tension mechanisms, wherein the first lug mechanism is mounted in the projectile in a first direction and the second lug mechanism is mounted in the projectile in a second direction opposite the first direction, wherein the first lug mechanism and the second lug mechanism are configured to provide axial support, and the first lug mechanism is configured to provide the axial support in an opposite direction than the second lug mechanism.

According to a tenth aspect, an apparatus for coupling a device to an aircraft comprising: A) a door frame comprising a channel; B) a lug base comprising a plurality of apertures configured to fit at least one retaining pin; C) a lug configured to be coupled to the aircraft and to pivot about a pin in the lug base between a first position substantially perpendicular to the door frame and a second position substantially parallel to the door frame; D) a door configured to move within the channel of the door frame between an open position and a closed position; E) at least one closing mechanism; and F) a door lock.

According to an eleventh aspect, the apparatus of the tenth aspect or any other aspect, wherein the door lock comprises a first locking component coupled to the door and a second locking component coupled to the lug base.

According to a twelfth aspect, the apparatus of the tenth aspect or any other aspect, wherein the at least one closing mechanism is configured to: A) couple to the door at a first end and to the lug base at a second end; B) apply a closing force on the door toward the closed position; and C) cause the door to apply a force to the side surface of the lug based on the closing force, wherein the at least one closing mechanism comprises a pair of closing springs.

According to a thirteenth aspect, the apparatus of the tenth aspect or any other aspect, wherein the door is free to move from the open position to an intermediary position when the lug is in the first position and is free to move from the open position to the closed position when the lug is in the second position.

According to a fourteenth aspect, the apparatus of the thirteenth aspect or any other aspect, wherein the intermediary position corresponding to a position of the door when the door is in contact with a side surface of the lug.

According to a fifteenth aspect, the apparatus of the tenth aspect or any other aspect, wherein the lug is configured to be held in the first position when coupled to the aircraft and free to move between the first position and the second position when not coupled to the aircraft.

According to a sixteenth aspect, the apparatus of the tenth aspect or any other aspect, wherein the second locking component comprises a plurality of ridges configured to catch a ridge of the first locking component to prevent movement in a single direction.

According to a seventeenth aspect, the apparatus of the sixteenth aspect or any other aspect, wherein the single direction corresponds to opening of the door.

According to an eighteenth aspect, a method for attachment of a projectile to an aircraft and release of the projectile from the aircraft, comprising the steps of: A) positioning a lug mechanism in an opening of the projectile, the lug mechanism comprising a door frame, a lug base, a lug, a door, at least one closing mechanism, and a door lock; B) inserting one or more pins through a plurality of apertures of the lug mechanism, wherein the lug base comprises a subset of the plurality of apertures and the lug comprises a pair of the plurality of apertures, wherein when inserted, the lug is substantially rotatable about one of the one or more pins; and C) coupling the projectile to the aircraft by connecting a coupling apparatus of the aircraft to the lug of the lug mechanism.

According to a nineteenth aspect, the method of the eighteenth aspect or any other aspect, further comprising: A) positioning a second lug mechanism in a second opening of the projectile, the second lug mechanism comprising a second door frame, a second lug base, a second lug, a second door, at least one second closing mechanism, and a second door lock; and B) inserting one or more second pins through a plurality of second apertures of the second lug mechanism, wherein the second lug base comprises a subset of the plurality of second apertures and the second lug comprises a second pair of the plurality of second apertures, wherein when inserted, the second lug is substantially rotatable about one of the one or more second pins, wherein coupling the projectile to the aircraft further comprises connecting a second coupling apparatus of the aircraft to the second lug of the second lug mechanism.

According to a twentieth aspect, the method of the eighteenth aspect or any other aspect, wherein inserting the one or more pins comprises: A) inserting the one more pins through the plurality of apertures from a first side of the lug mechanism to a second side of the lug mechanism; and B) pushing, via inserting the one or more pins, one or more retaining pins out of the lug mechanism through the second side of the lug mechanism.

These and other aspects, features, and benefits of the claimed apparatuses and methods will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
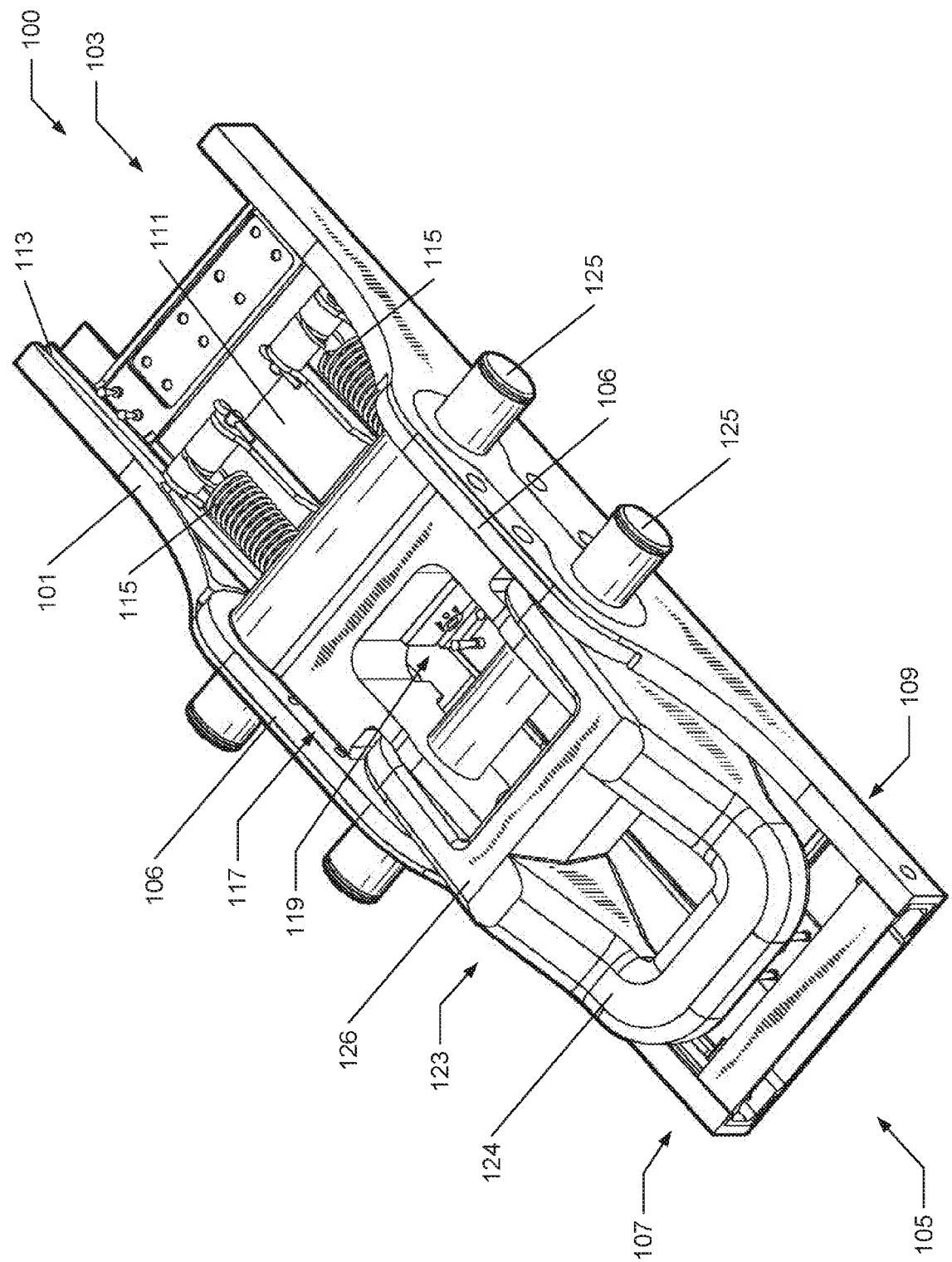
FIG. 1 illustrates a perspective view of a lug assembly in a second position according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to apparatuses, methods, and assemblies for coupling and decoupling a projectile to and from an aircraft.

According to one embodiment, provided herein is a lug assembly for coupling and decoupling a projectile to and from larger objects such as aircrafts, watercrafts, land vehicles, and other large objects. In one embodiment, a projectile can be coupled to an aircraft or other object via a lug mechanism. The lug assembly can be inserted into an aperture in the projectile and affixed to the projectile. In some embodiments, the lug assembly can be affixed to the projectile by inserting a retaining pin through a first component of the projectile, through the lug assembly, and into a second component of the projectile.

The large object can include one or more clamping mechanisms. The clamping mechanism can include a rack or clamp that attaches to a lug positioned on a projectile. When the projectile is to be released (e.g., when an aircraft launches the projectile), the clamping mechanism can be released from the lug. The clamping mechanism can be released by releasing a clamping pressure or rotating a rack, among other releasing mechanisms. Without the connection between the one or more clamping mechanisms and lugs, the projectile can be free to launch. Once free, a tension mechanism that applies a force on a door can cause the lug to rotate into the lug mechanism and stored away. The door can be moved to cover an aperture where the lug protruded from while connected.

As described herein, unlike previous approaches, the lug assembly advantageously allows for preservation of an aerodynamic profile of the projectile upon the projectile being decoupled from an aircraft. In at least one embodiment, the lug assembly can include materials including, but not limited to, aluminum, steel and titanium. In one embodiment, the lug assembly may include only aluminum or only titanium or only steel material. The lug assembly can be fabricated to a particular mass that is equal to a mass of previous lug assemblies, thereby advantageously allowing for easy replacement of previous systems or devices utilized to couple and decouple a projectile to an aircraft.

The lug assembly can include a frame, and the lug assembly can be attached with a projectile such that the frame does not project outward from a surface of the projectile. The frame can include a lug base, and a lug can be configured in the lug base such that, when the projectile is decoupled from the aircraft, the lug can freely rotate from a first lug position to a second lug position. When the lug rotates to the second position, the lug may not project outward from the surface of the projectile and, thus, an aerodynamic profile of the projectile can be preserved.

The frame can include channels for slidably receiving a door. A closing mechanism can be connected to the door and the lug base. The closing mechanism can apply a closing force to the door causing the door to slide through the channels. The door can slide through the channels from an open position to an intermediate position and from the intermediate position to a closed position. In the open position, the door may not be in contact with a side surface of the lug. In the intermediate position, the door may be tangent to and in conflict with the side surface of the lug. While in contact with the side surface of the lug, the closing force can cause the door to apply a force to the lug. Upon the projectile decoupling from the aircraft, the applied force can cause the lug to rotate about the lug base from the first lug position to the second lug position. Upon the lug rotating to the second lug position, the closing force can cause the door to slide further through the channels, thereby transitioning the door to the closed position. In the closed position, the door can substantially seal the frame opening, thereby reducing presence of surfaces and protrusions that could compromise the aerodynamic profile of the projectile (e.g., due to generation of frictional forces that cause drag and/or deformation of the lug assembly and projectile).

Exemplary Embodiments

Referring now to the figures, for the purposes of example and explanation of the fundamental processes and components of the disclosed systems, apparatuses, devices and methods, reference is made to FIG. 1, which illustrates a perspective view of one embodiment of a lug assembly 100 (also referred to as a lug mechanism, system, or apparatus) in a second position. According to one embodiment, in the second position, the lug assembly 100 is in a released state and is not coupled to an aircraft (e.g., the lug assembly 100 has been decoupled from an aircraft). In various embodiments, FIG. 1 shows the lug assembly 100 from an underside perspective (e.g., as would be viewed with respect to a projectile to which the lug assembly 100 would be coupled during a period of use) and in a closed figuration (e.g., a second position described herein). As will be understood and appreciated, the lug assembly 100 shown in FIG. 1 represents merely one approach or embodiment of the present system, and other aspects are used according to various embodiments of the present system.

The lug assembly 100 provides for attachment of a projectile to an aircraft and release of the projectile from the aircraft. As described herein, a projectile includes any object that can be coupled to an aircraft via a lug regardless of whether a propulsion mechanism is attached to the projectile. The lug assembly 100 can include a frame 101 (also referred to herein as a door frame 101) including a frame body and a frame opening. The frame body can be substantially rectangular-shaped body or have another shape. The frame 101 can include a first end portion 103, a second end portion 105, a first side portion 107, and a second side portion 109. The first end portion 103 can be operatively connected to a first end of the first side portion 107 and a first end of the second side portion 109. The second end portion 105 can be operatively coupled to a second end of the first side portion 107 and a second end of the second side portion 109. The coupling of the portions 103, 105, 107, and 109 can be a welded coupling, a riveted coupling, a threaded coupling, or some other coupling as can be appreciated. The first side portion 107, second side portion 109, first end portion 103, and second end portion 105 can form the frame body of the frame 101, within which is the frame opening. The first side portion 107 and the second side portion 109 can each include a channel 113 for slidably receiving a door 111 included in the lug assembly 100. In various embodiments, only the first side portion 107 includes a channel 113, and, in other embodiments, only the second side portion 109 includes a channel 113.

The frame 101 can include a lug receipt 106 that includes a lug base 117. The lug base 117 can include a plurality of apertures, each aperture configured to receive and fit at least one retaining pin 125. The lug base 117 can include a lug 123 that can be coupled to an aircraft. The lug 123 can be configured to pivot about a retaining pin 125 in the lug base 117 between a first lug position substantially perpendicular to the frame 101 and a second lug position substantially parallel to the frame 101. The lug 123 can be held in the first lug position when coupled to the aircraft, and can be free to move between the first lug position and the second lug position when not coupled to the aircraft. In the first lug position, the lug can protrude from an opening in the projectile. In the second lug position, the lug 123 can be contained within the projectile, thereby preserving the aerodynamic profile of the projectile, because the lug 123 no longer projects outward therefrom.

The lug 123 can include a first lug portion 124 integrally connected to a first end of a second lug portion 126. A second end of the second lug portion 126 can be coupled to the lug base 117 via the retaining pin 125. As described herein, the first lug portion 124 can include a substantially U-shaped body, and the second lug portion 126 can include a substantially half-rectangular body including a first leg and a second leg. The lug base 117 can include a substantially half-rectangular body including a third leg and a fourth leg. The first, second, third, and fourth legs may each include a hole that receives a pin 125. When the first, second, third, and fourth legs are suitably aligned, a pin 125 can be inserted through the holes thereof, thereby coupling the second end of the second lug portion 126 to the lug base 117. According to one embodiment, the first lug portion 124 is integrally connected to the first end of the second lug portion 126 at a first end, and a depth of the first end of the first lug portion 124 exceeds a depth of a second end of the first lug portion 124.

Figure 2:
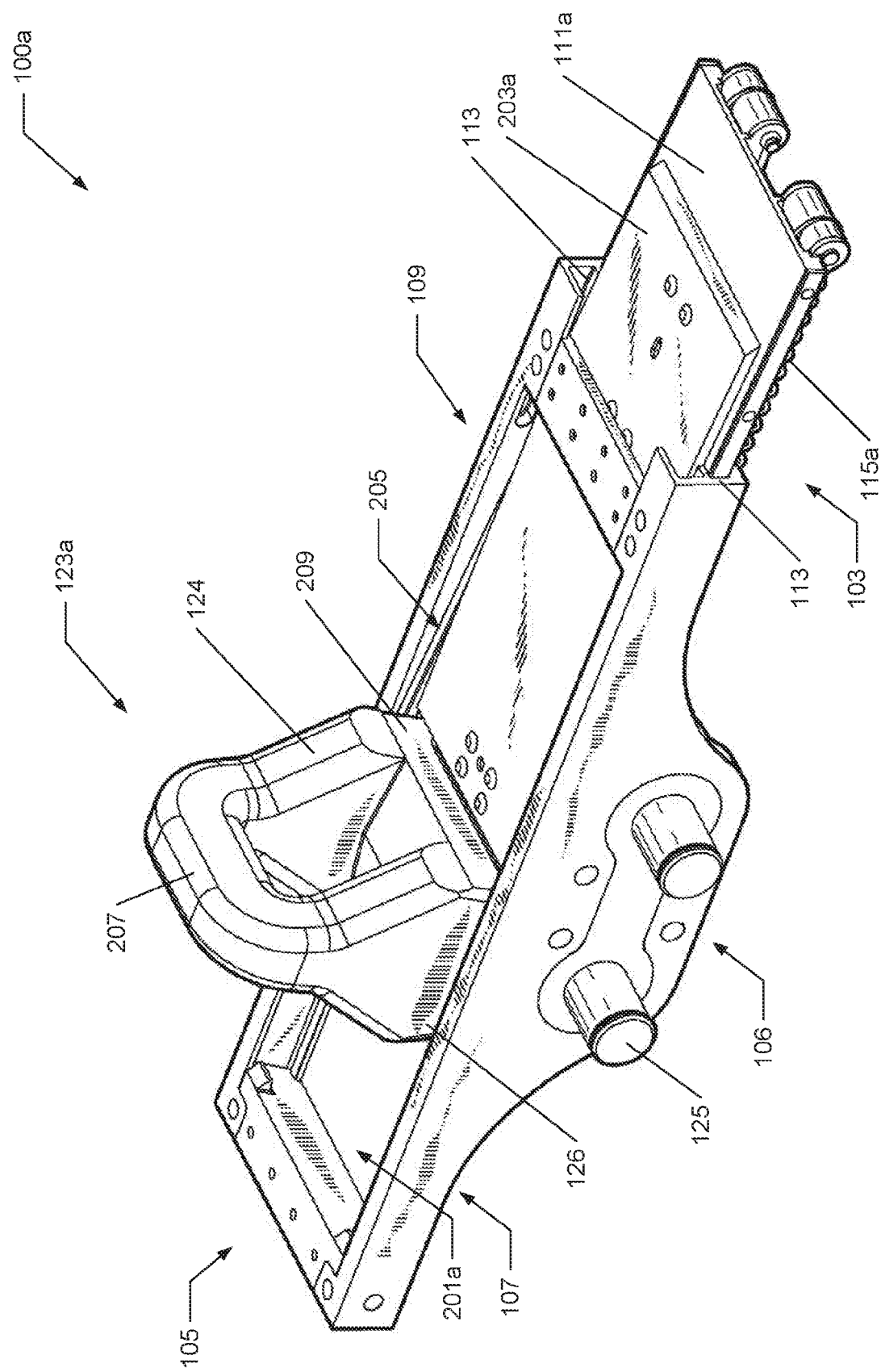
FIG. 2 illustrates a perspective view of a lug assembly in a first position according to one embodiment of the present disclosure.

The door 111 can include a frame body, such as a substantially rectangular-body. The door 111 can be received by the channel 113 of the first side portion 107 and the second side portion 109. The door 111 can slide between an open position and a closed position. When the lug is in an open position, the door 111 can be positioned in an intermediate position where the door 111 is in contact with the lug 123 (e.g., as shown in FIG. 2). The door 111 can include (or form) a top surface of the frame 101. When the door is in the open state and/or the intermediate position, the door 111 can be tangential to the lug 123. The lug 123 can prevent the door 111 from moving from the intermediate position to the closed position when the lug 123 is in an open position. When the door is in the closed position, the top surface of the frame 101 (included or formed by the door 111) can substantially seal the frame opening. In the intermediate position, the door 111 can be configured to apply a force to a side surface of the lug 123. To transition between the open and closed positions, the door 111 can traverse along the channels 113. According to one embodiment, the door 111 is free to move from the open position to an intermediary position when the lug 123 is in the first lug position and is free to move from the open position to the closed position when the lug 123 is in the second lug position. When the lug 123 is coupled to an aircraft, the lug 123 can be fixed in the open position, thereby restricting the door 111 from moving to the closed position. The door 111 can be in the intermediate position pushing, via a closing force, against the lug 123 until the lug 123 is released from the aircraft. Once released, the door 111 can, via the closing force, push the lug 123 to rotate downward about the pin 125 and into the projectile to the second lug position. The door 111 can move to the closed position once the lug 123 is out of the way.

The door 111 can be slidably connected to the frame 101 by the channels 113 and the closing mechanism. A first end of the closing mechanism can couple to the door 111 and a second end of the closing mechanism can be coupled to the lug base 117. The closing mechanism can apply a closing force on the door 111 in a direction toward the closed position, thereby causing the door 111 to apply the force to the side surface of the lug 123. According to one embodiment, the closing mechanism can include one or more tension mechanisms (also referred to as a closing mechanism). The tensioning mechanism 115 can include one or more springs, legs, elastic material, pre-bent metal, etc. The one or more tensioning mechanisms 115 can each include a first spring end and a second spring end, the first spring end can be operatively connected to the lug base 117 while the second spring end can be operatively connected to the door 111. The one or more tensioning mechanisms 115 can be further extended when the door 111 is in the open position than when the door is in the closed position.

The lug assembly 100 can include a locking mechanism 119 configured to restrict movement of the door 111 in a first direction once the door 111 moves in a second direction past any of one or more predetermined points, the first direction being opposite the second direction. The first direction can refer to a direction transitioning from the closed position to the intermediate and open positions. In some embodiments, the one or more predetermined points can refer to one or more points reached between the intermediate position and the closed position. In some embodiments, the one or more predetermined points can include a point reached in the intermediate position. Thus, the locking mechanism 119 can prevent the door 111 from opening after the door 111 has moved from the intermediate position to the closed position. The locking mechanism 119 can also be referred to herein as a door lock.

A frame 101, lug receipt 106, lug base 117, and lug 123 can include a plurality of apertures for receiving retaining pins 125 and other pins described herein. The frame 101, lug receipt 106, and lug base 117 of the lug assembly 100 can each include an aligned subset of the plurality of apertures, and the first lug portion 124 can include an aligned pair of the plurality of apertures aligned with the aligned subset. Upon insertion, a first retaining pin 125 passes through the aligned subset and aligned pair of the plurality of apertures, thereby securing the lug 123 to the lug assembly 100 such that the lug 123 is substantially rotatable about the inserted retaining pin 125. The frame 101, lug receipt 106, and lug base 117 can each include a second aligned subset of the plurality of apertures. Upon insertion, a second retaining pin 125 passes through the second aligned subset, thereby securing the lug receipt 106 within the frame 101 and securing the lug base 117 within the lug receipt 106.

According to one embodiment, when the lug assembly 100 is positioned within a projectile, the insertion of the first and second retaining pins 125 secures the lug assembly 100 within the projectile. The projectile can be configured to securely receive the inserted first and second retaining pins 125 such that the lug assembly 100 is securely attached within the projectile. For example, the first and second retaining pins 125 can be threaded on each end, and the projectile can include threaded connections for securely connecting to each end of the first and second retaining pins 125. As another example, the inserted first and second retaining pins 125 can be affixed within the projectile via welding, fasteners, cotter pins, retaining clips, and/or other fixation techniques.

According to one embodiment, to secure the lug assembly 100 within a projectile, the retaining pins 125 may be replaced with attachment pins. For example, prior to the lug assembly 100 being positioned in an opening of the projectile, retaining pins 125 can be inserted through the plurality of apertures and the second plurality of apertures to appropriately secure, as described herein, the frame 101, lug receipt 106, lug base 117, and lug 123 within the lug assembly 100. A length of the retaining pins 125 can be sized to not extend past the outer edge of the frame 101, thereby enabling the lug assembly 100 to be inserted into a projectile. Upon positioning the lug assembly 100 within the projectile, one or more attachment pins are inserted through the first and second plurality of apertures from a first side of the lug assembly 100 to a second side of the lug assembly 100. During insertion of the one or more attachment pins, each of the one or more attachment pins makes sustained contact with and pushes one of the inserted retaining pins 125 out of the lug assembly 100 through the second side thereof. Because the contact within each pair of retaining pin and attachment pin is sustained, the secured structure of the lug assembly 100 may be maintained throughout the "pushing out" of the inserted retaining pins. The projectile can securely receive and retain the attachment pins via threading, welding, fasteners, and/or other fixation techniques. The projectile can be coupled to an aircraft via a coupling apparatus that couples the aircraft to the lug 123.

According to one embodiment, two lug assemblies 100 are attached within a projectile. The first lug assembly 100 includes one or more of a first frame 101, first lug receipt 106, first lug base 117, first lug 123, first door 111, first locking mechanism 119, and first closing mechanism (e.g., a first set of one or more tension mechanisms 115). The second lug assembly 100 includes a second lug mechanism including one or more of a second frame 101, second lug receipt 106, second lug base 117, second lug 123, second door 111, second locking mechanism 119, and second closing mechanism (e.g., a second set of one or more tension mechanisms 115). The first lug assembly 100 can be mounted via one or more retaining pins 125 in the projectile with the lug 123 configured to rotate in a first direction and the second lug assembly 100 can be mounted via one or more retaining pins 125 in the projectile with the lug 123 being configured to rotate in a second direction opposite the first direction. The first lug assembly 100 and the second lug assembly 100 can provide axial support to the projectile on an axis corresponding to a longitudinal/roll axis of the airplane (e.g., from nose to tail). In particular, the first lug assembly 100 can be configured to provide the axial support in an opposite direction than the second lug assembly 100. Upon the projectile decoupling from an aircraft, the first lug 123 and second lug 123 can rotate from the first lug position to the second lug position, and the first door 111 and second door 111 can transition from the intermediate position to a closed position, thereby preserving an aerodynamic profile of the projectile. Because the second lug assembly 100 is positioned in the second direction opposite the first direction of the first lug assembly 100, a rotational direction of the second lug 123 can be opposite the rotational direction of the first lug 123 during the transition from the first lug position to the second lug position.

An aircraft can include a wheel assembly that can be extended for takeoff and landing and retracted during flight. To extend and retract the wheel assembly, the aircraft needs to include motors, supply power, and structural support for the wheel assembly. In contrast, the lug assembly 100 does not utilize an external power source or motor to move the lug 123. The lack of motors and use of a tension mechanism can result in the door 111 being closed at a speed that greatly exceeds that of retracting or extending a wheel assembly. Further, tensioning mechanism as described herein require less maintenance and are more reliable when compared to motors.

With reference to FIG. 2, shown is a perspective view of the lug assembly 100 in a first position. In various embodiments, FIG. 2 shows the lug assembly 100 from a topside perspective (e.g., as would be viewed with respect to a projectile to which the lug assembly 100 would be coupled during a period of use) and in an open figuration (e.g., in a first or intermediate position described herein).

According to one embodiment, FIG. 2 shows the lug assembly 100 including, as described herein, the lug 123 in the open lug position and the door 111 in the intermediate position. The lug 123 is positioned substantially perpendicular to the frame 101, and is free to rotate about the retaining pin 125. The one or more tension mechanisms 115 apply the closing force on the door 111 towards the closed position, thereby causing the door 111 to apply the force to the side surface of the lug 123 based on the closing force. Because of the applied closing force, the door 111 is held tangent to the lug 123. As shown in one embodiment, if not attached to an aircraft, lug assembly 100 is unable to maintain the current position. The door 111, via the tension mechanism 115, will force the lug 123 to rotate about the pin 125, and the door 111 will move from the intermediate position to the closed position. In some embodiments, a retaining mechanism similar to the locking mechanism 119 can operate in a reverse orientation to hold the door open during installation. The door 111 can be held at a position between the open and intermediary positions to prevent the door 111 from traversing past the intermediary position and closing, which would prevent the lug 123 from being accessible during a coupling of the projectile to the aircraft.

As described herein, the frame 101 can include the first end portion 103, the second end portion 105, the first side portion 107, and the second side portion 109 that form the frame opening 201. In various embodiments, the first end portion 103, the second end portion 105, the first side portion 107, and the second side portion 109 can be integrally formed. In one or more embodiments, the first end portion 103, the second end portion 105, the first side portion 107, and the second side portion 109 may be formed separately and connected via one or more attachment techniques including, but not limited to, welding, fastening, riveting, and/or other fixation techniques.

As shown in FIG. 2, in the open and/or intermediate position, the door 111 can partially seal the frame opening 201. The door 111 can include (or form) a top surface 203 of the frame 101. The top surface 203 can be integrally formed with the door 111, or may be formed separated from the door 111 and attached thereon. The top surface 203 can be sized to conform to a footprint of the frame opening 201 such that, when the door 111 is in the closed position, the top surface 203 fully seals the frame opening 201.

The channels 113 can include sloped regions 205 for transitioning a travel path of the door 111 upwards as the door 111 transitions toward the closed position. For example, in the open and/or intermediate positions, the channels 113 substantially orient the travel path of the door 111 at a first plane. In the same example, as the door 111 moves along the travel path toward the closed positions, sloped regions 205 of the channels 113 transition the travel path from the first plane to a second plane superior to the first plane and the lug 123 (in the closed lug position). Transition to the second plane positions the top surface 203 within the frame 101 such that the top surface 203 fully occludes and seals the frame opening 201. According to one embodiment, the door 111 (e.g., including the top surface 203) is oriented substantially parallel to the frame 101 throughout the movement along the travel path. In other words, in various embodiments, the travel path causes the door 111 to translate forwards and upwards at angle (e.g., from the first plane to the second plane), and the door 111 remains substantially parallel to the frame 101 throughout the translation.

As described herein, the lug 123 can include the first lug portion 124 and the second lug portion 126. The first lug portion 124 can include a substantially U-shaped body 207 that can be coupled to a coupling apparatus of an aircraft, thereby securing a projectile (connected to the lug assembly 100) to the aircraft. The second lug portion 126 can include a substantially half-rectangular body 209 with which the first lug portion 124 can be integrally formed.

In one or more embodiments, the first lug portion 124 and/or lug base 117 may be a quick-disconnection port, or may be replaced with one or more quick-disconnection port components. For example, in some embodiments, the first lug portion 124 may be a quick disconnection port that, while connected to an aircraft, provides for transport of fuel, electricity, and/or data between an attached projectile and the aircraft. In the same example, the quick disconnection port, upon the projectile being detached from the aircraft, can reorient to be contained within the projectile (e.g., via rotation of the lug 123 about the retaining pin 125 and the transition of the door 111 from the open position to the closed position), thereby preserving the aerodynamic profile of the projectile. In some embodiments, the quick disconnection port is included in addition to the first lug portion 124 and/or lug base 117, such that the airplane couples to the projectile via the lug 123 to carry the projectile, while also including a quick disconnection port to communicate, power, or fuel the projectile via the quick disconnection port. In other embodiments, the quick disconnection port (or one or more components thereof) can replace the first lug portion 124 and/or the lug base 117 (FIG. 1). In some embodiments, two or more lug assemblies 100 attach the projectile to the aircraft, while one or more additional included lug assemblies 100, each including one or more quick disconnection ports (e.g., but omitting the first lug portion 124 and/or the lug base 117), facilitates transfer of fuel, electricity, and/or data either to or from the projectile, or both.

Figure 3:
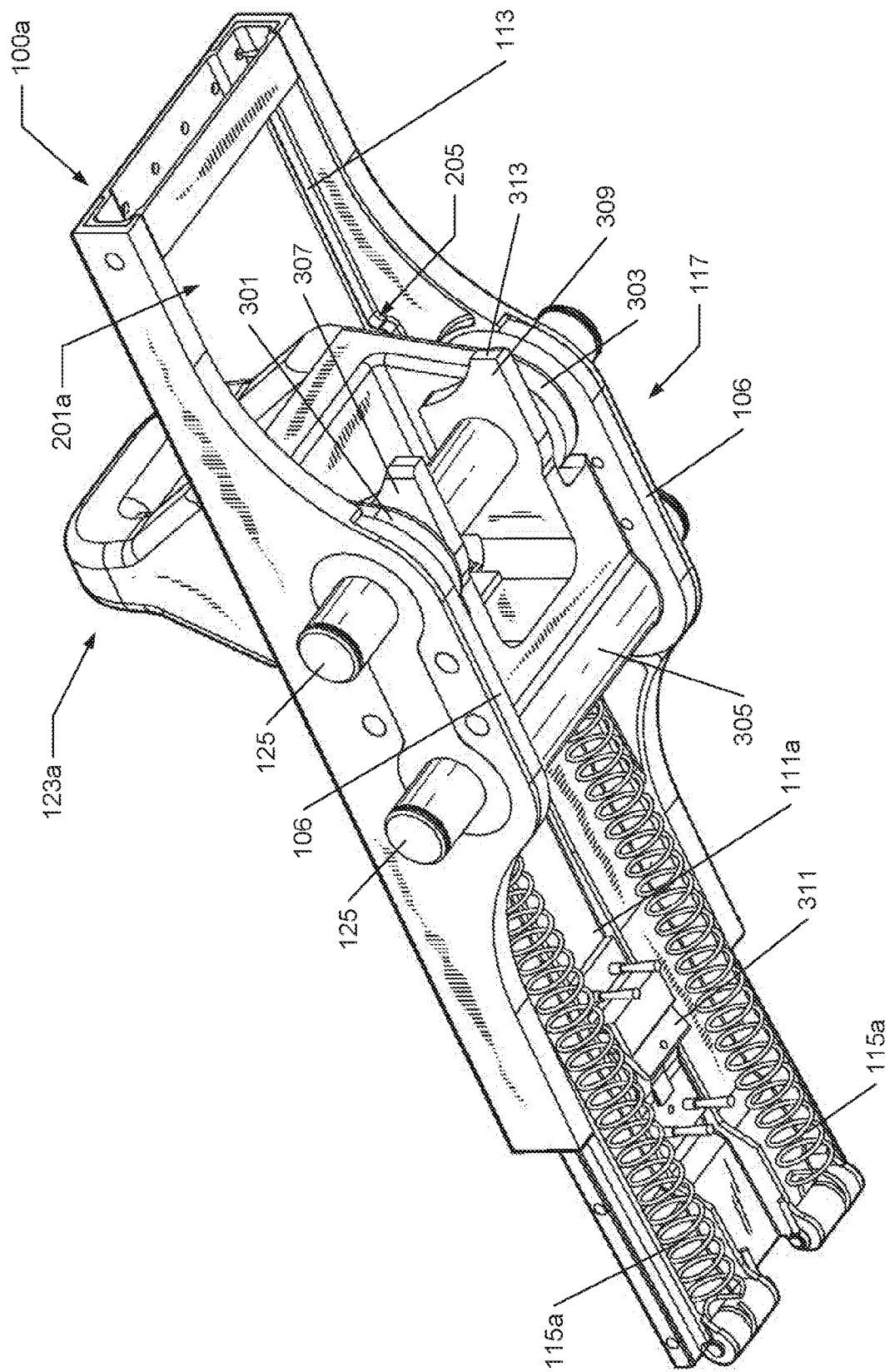
FIG. 3 illustrates a perspective view of a lug assembly in the first position according to one embodiment of the present disclosure.

With reference to FIG. 3, shown is a perspective view of the lug assembly 100 in the first position. In various embodiments, FIG. 3 shows the lug assembly 100 from an underside perspective (e.g., as would be viewed with respect to a projectile to which the lug assembly 100 would be coupled during a period of use) and in an open figuration (e.g., in a first or intermediate position described herein).

As described herein, the second lug portion 124 can include the substantially half-rectangular body 207, as well as first leg 301 and a second leg 303. The first leg 301 and second leg 303 can be substantially parallel and can each include one or more apertures for receiving pins, such as retaining pins 125 and attachment pins. The lug base 117 can include a substantially half-rectangular body 305 including a third leg 307 and a fourth leg 309. The third leg 307 and fourth leg 309 can be substantially parallel and can each include one or more apertures for receiving pins 125, such as retaining pins and attachment pins. The first leg 301 and second leg 303 can be aligned with the third leg 307 and fourth leg 309 such that an aperture of each leg is aligned and a retaining pin 125 can be passed through the apertures thereby securing the lug 123 to the lug base 117. The substantially half-rectangular body 305, frame 101, and lug receipt 106 can each include an aperture for receiving a pin, such as a retaining pin 125 or an attachment pin. As shown in FIG. 3, the apertures of the rectangular body 305, frame 101, and lug receipt 106 can be aligned such that a retaining pin 125 can be passed through the aligned apertures, thereby securing the lug receipt 106 to the frame 101 and securing the lug base 117 to the lug receipt 106 (and/or the frame 101).

The third leg 307 and fourth leg 309 can each include a lug stop 313 that restricts rotation of the lug 123 about the retaining pin 125 inserted therein. The lug stop 313 can determine the orientation of the lug 123 at the second lug position. The lug stop 313 can be configured such that, when the lug 123 reaches the second lug position, the lug 123 is rotated completely within the frame 101 such that the door 111 can slide over the lug 123 from the intermediate position to the closed position (thereby sealing the frame opening 201). Because the frame opening 201 is sealed and the lug 123 does not project outward from the projectile when in the second lug position, the aerodynamic profile of the projectile is advantageously preserved.

Figure 4:
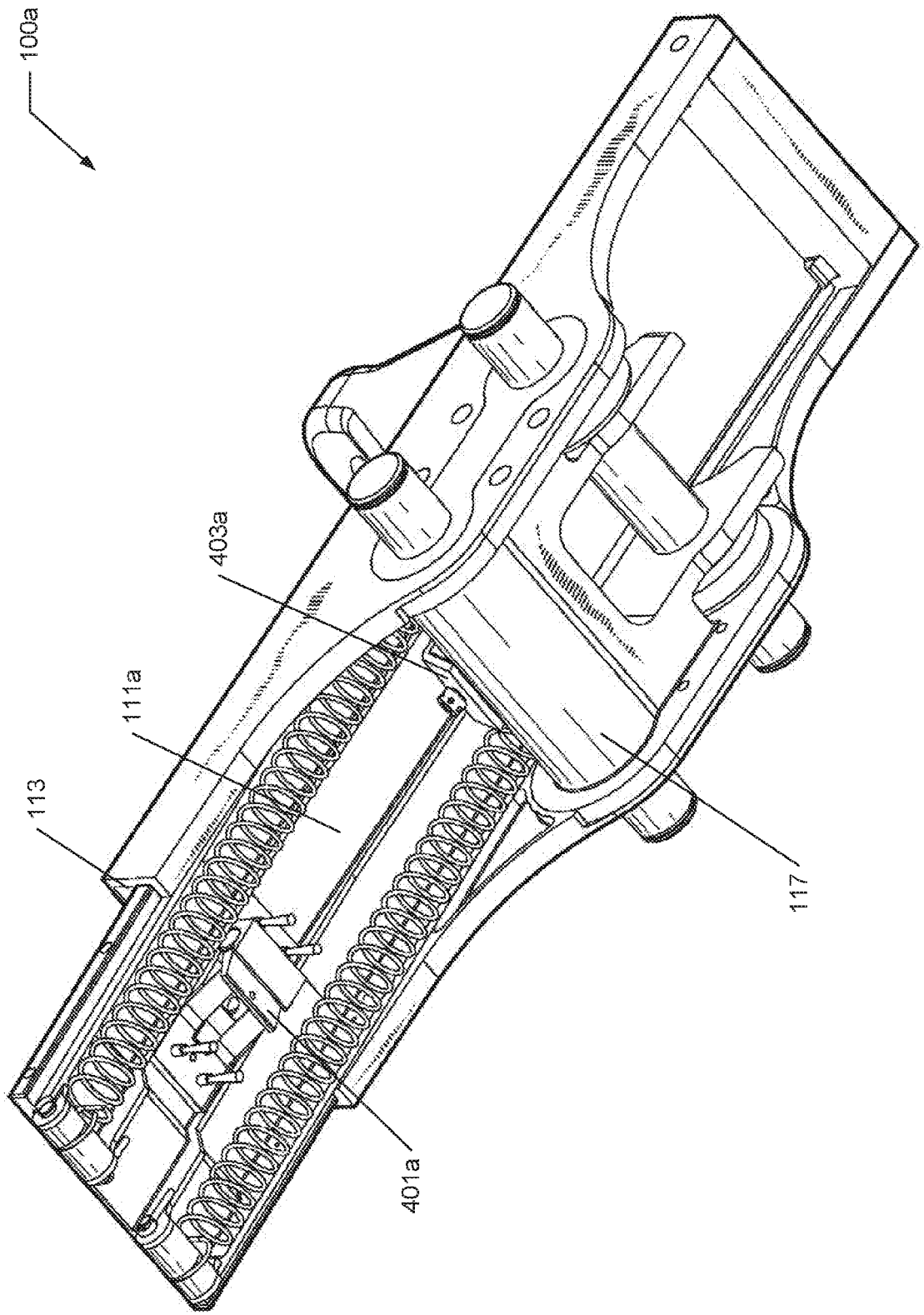
FIG. 4 illustrates a perspective view of a lug assembly in the first position according to one embodiment of the present disclosure.

With reference to FIG. 4, shown is a perspective view of the lug assembly 100 in the first position. In various embodiments, FIG. 4 shows the lug assembly 100 from an underside perspective (e.g., as would be viewed with respect to a projectile to which the lug assembly 100 would be coupled during a period of use) and in an open figuration (e.g., in a first or intermediate position described herein).

As described herein, the lug assembly 100 can include a locking mechanism 119 (not shown in FIG. 4). The locking mechanism 119 can include a first locking component 401 coupled to the door 111 and a second locking component 403 coupled to the lug base 117. The second locking component 403 can interface with the first locking component 401 to form the locking mechanism 119 that secures the position of the door 111 within the channels 113.

In one example, the first locking component 401 includes a pawl (or other securing, catching mechanism) and the second locking component 403 includes a rack (or other securing, catchable mechanism). The rack can be received (e.g., caught) by the pawl, thereby securing the position of the door 111 within the channels 113. The rack and pawl interaction can form the locking mechanism 119 to prevent, as described herein, movement of the door 111 in the first direction after the door 111 moves in the second direction past the predetermined point.

In another example, the first locking component 401 includes a first one or more tabs, protrusions, or ridges, and the second locking component 403 includes a second one or more tabs, protrusions, or ridges. In one embodiment, the first locking component 401 is a protrusion and the second locking component 403 is more than one ridge. A first ridge can pass over one or more ridges of the second ridges restricting movement in an opposite direction of travel at each ridge as the door 111 moves past. The first ridge moving past each second ridge can form the locking mechanism 119 that prevents the movement of the door 111 in the first direction after the door 111 moves in the second direction past each predetermined point, where each predetermined point corresponds to when the first ridge moves past each respective ridge of the second ridges.

Figure 5:
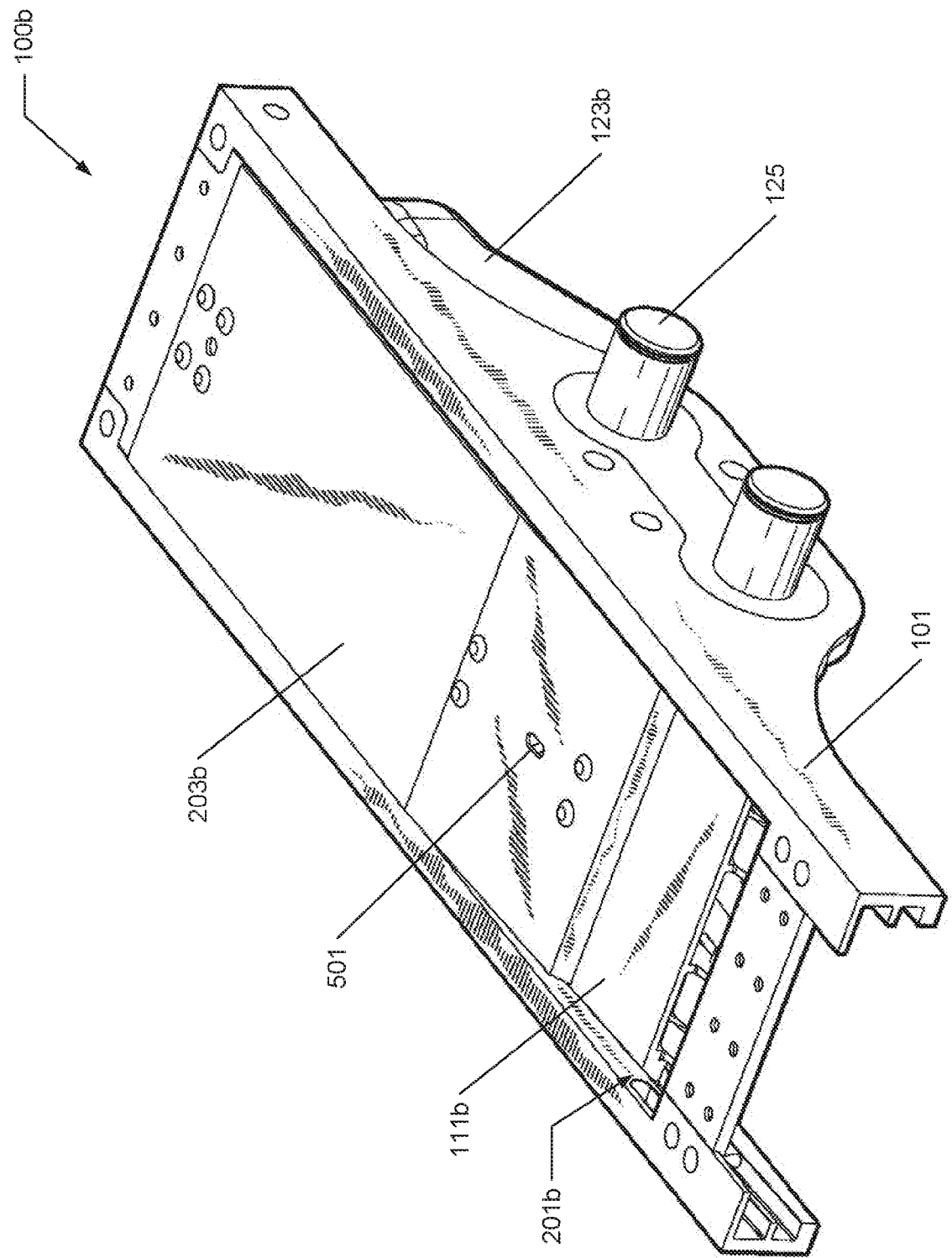
FIG. 5 illustrates a perspective view of a lug assembly in the second position according to one embodiment of the present disclosure.

With reference to FIG. 5, shown is a perspective view of the lug assembly 100 in the second position. In various embodiments, FIG. 4 shows the lug assembly 100 from a topside perspective (e.g., as would be viewed with respect to a projectile to which the lug assembly 100 would be coupled during a period of use) and in a closed figuration (e.g., in a second position described herein).

According to one embodiment, FIG. 5 shows the lug assembly including the door 111 in the closed position and the lug 123 in the closed lug position. In some embodiments, the lug assembly 100 as shown corresponds to the lug assembly subsequent to the projectile undergoing a detaching/decoupling event from the aircraft. When the detaching/decoupling event occurs, the lug 123 can rotate about the retaining pin 125 such that the lug 123 does not occupy the frame opening 201 (FIG. 2). Upon decoupling of the lug 123 from an aircraft, the door 111 can push the lug 123 through a rotation about the retaining pin 125 such that the lug 123 rotates from the first lug position to the second lug position, thereby exiting out of the frame opening 201 and being positioned substantially parallel to the frame 101. Upon rotation of the lug 123 out of the frame opening 201, the door 111 transitions from the intermediate position (shown in FIGS. 2-4) to the closed position, thereby substantially sealing the frame opening 201. When the door 111 is in the closed position, the top surface 203 can form a substantially flat plane with the frame 101 such that the lug assembly 100 does not project outward from the projectile connected thereto, thereby preserving the aerodynamic profile of the projectile. As an example, the door 111, including any insulating materials on the door 111, can be flush with an exterior surface of the projectile.

In some embodiments, the position of the door 111 can be recessed relative to an opening of the projectile. The projectile can be covered in an insulative and aerodynamic material. When traveling at high speeds, friction from the projectile interfacing with the atmosphere can generate excessive heat. The insulative material can protect the internal components of the projectile from being damaged by the heat when traveling. Similarly, the door 111 can be covered in an insulative material to protect the projectile from heat. The insulative material can cover an entire top surface of the door 111 including covering the lock aperture 501. The insulative material may fill the recessed space when the door 111 is recessed relative to an opening of the projectile.

Upon the door 111 transitioning to the closed position, the locking mechanism 119 (FIG. 1) can engage, thereby preventing movement of the door 111 in the second direction (e.g., toward the intermediate and open positions). The locking mechanism 119 can prevent external forces (e.g., drag, wind, etc.) from causing the door 111 to transition out of the closed position. In some embodiments, if the door 111 moves past the intermediate positions but is prevented from reaching the closed position due to an unexpected obstruction, the locking mechanism 119 can prevent the door 111 from opening further based on first locking mechanism 401 (FIG. 4) and second locking mechanism 403 (FIG. 4) interfacing together along one of the ridges, protrusions, or tabs from each locking mechanism 401 and 403. The top surface 203 can include a lock aperture 501 configured to receive a tool for disengaging the locking mechanism 119. For example, a tool can be passed through the lock aperture 501 and cause the second locking component 403 to release the first locking component 401, thereby allowing for movement of the door 111 from the closed position.

Figure 6:
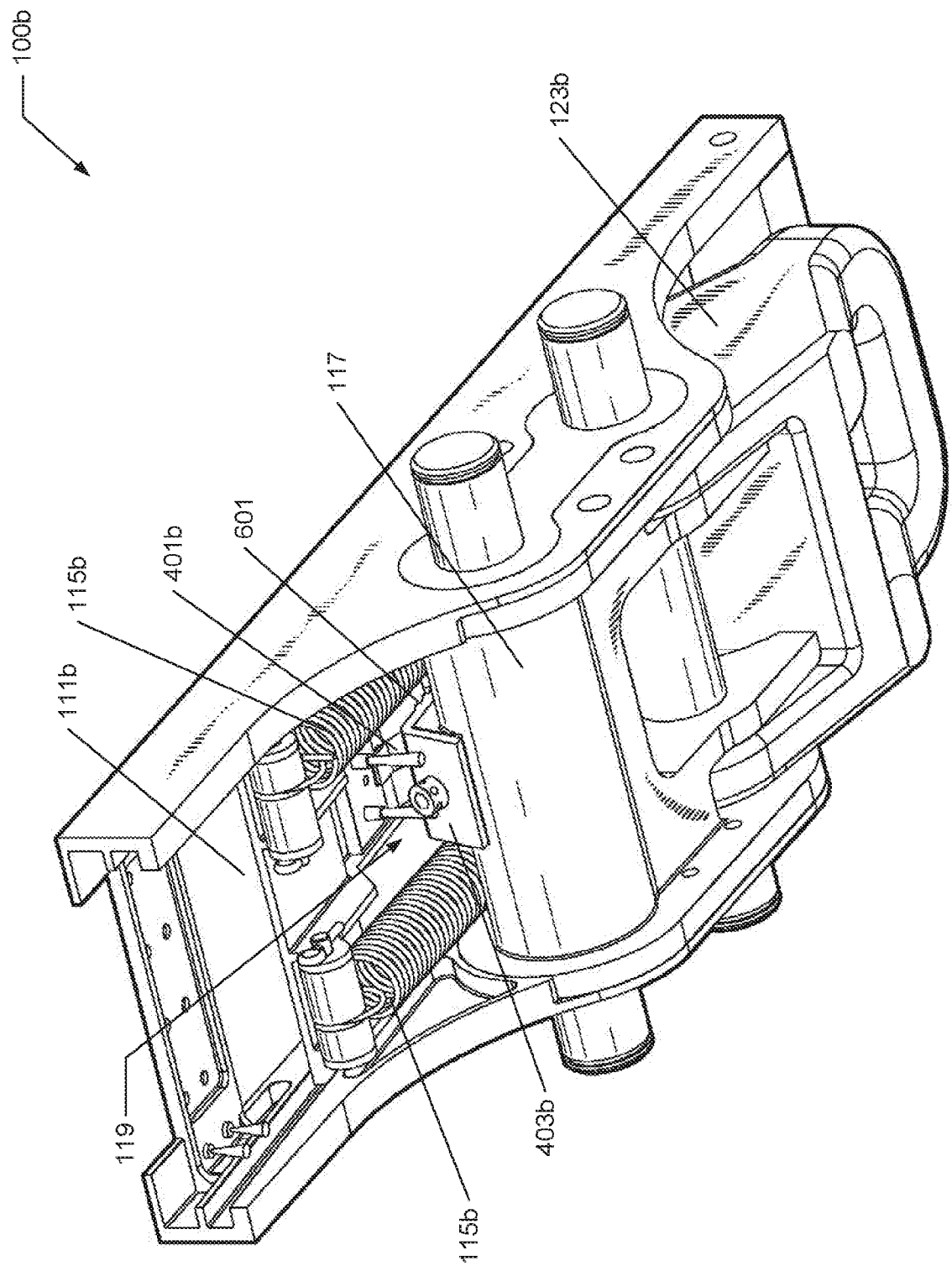
FIG. 6 illustrates a perspective view of a lug assembly in the second position according to one embodiment of the present disclosure.

With reference to FIG. 6, shown is a perspective view of the lug assembly 100 in the second position. In various embodiments, FIG. 4 shows the lug assembly 100 from an underside perspective (e.g., as would be viewed with respect to a projectile to which the lug assembly 100 would be coupled during a period of use) and in a closed figuration (e.g., in a second position described herein).

According to one embodiment, FIG. 6 shows the door 111 configured in the closed position and the lug 123 configured in the closed lug position. As described herein, the first locking component 401 can be attached to the door 111, and the second locking component 403 can be attached to the lug base 117. As shown in FIG. 6, when the door 111 moves to the closed position, the second locking component 403 can receive and secure the first locking component 401, thereby forming the locking mechanism 119 and preventing transition of the door 111 from the closed position. According to one embodiment, the second locking component 403 can include a plurality of ridges 601 configured to catch one or more protrusions included in the first locking component 401.

Figure 7:
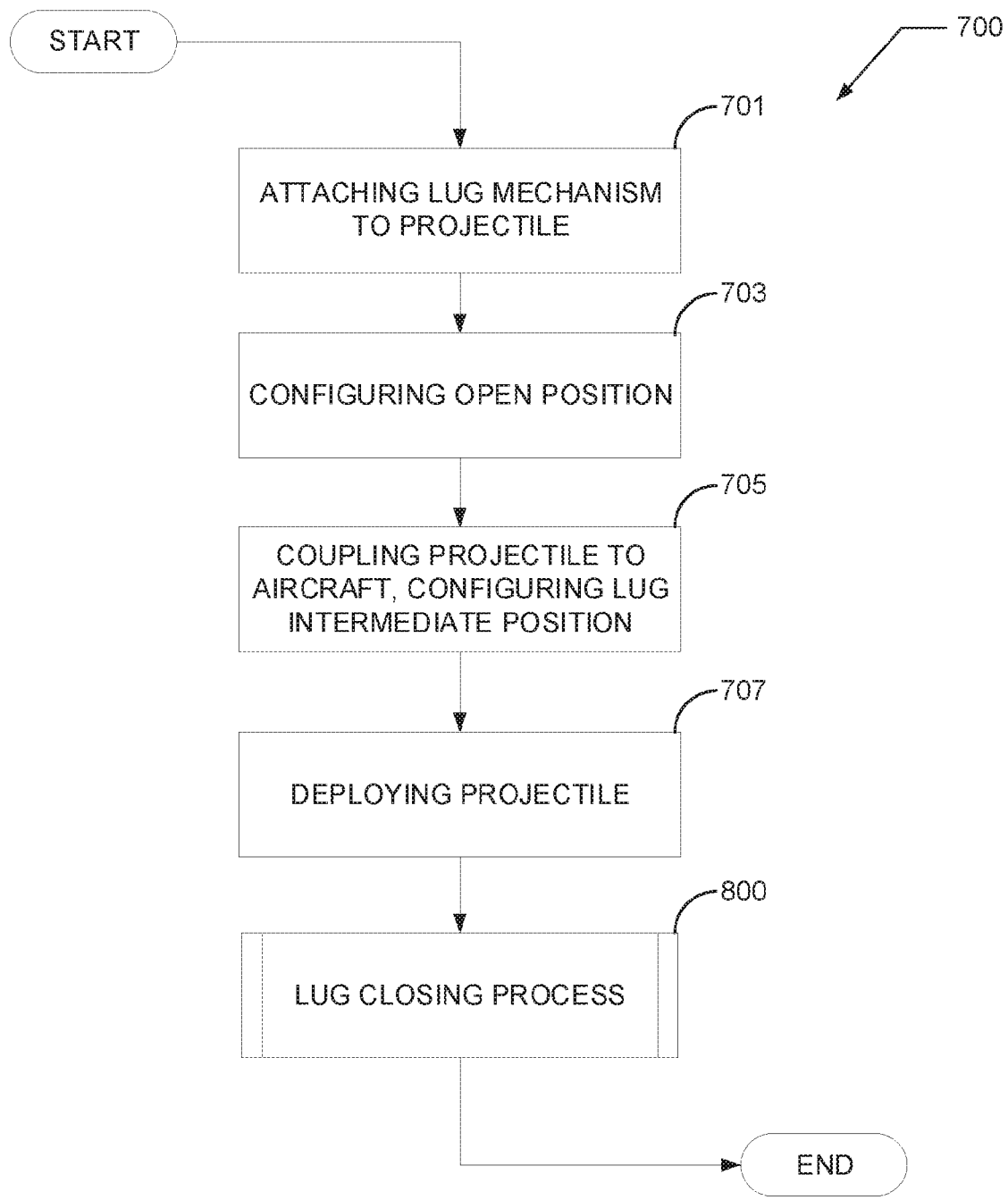
FIG. 7 illustrates a flowchart of an exemplary projectile coupling and decoupling process according to one embodiment of the present disclosure.
Figure 8:
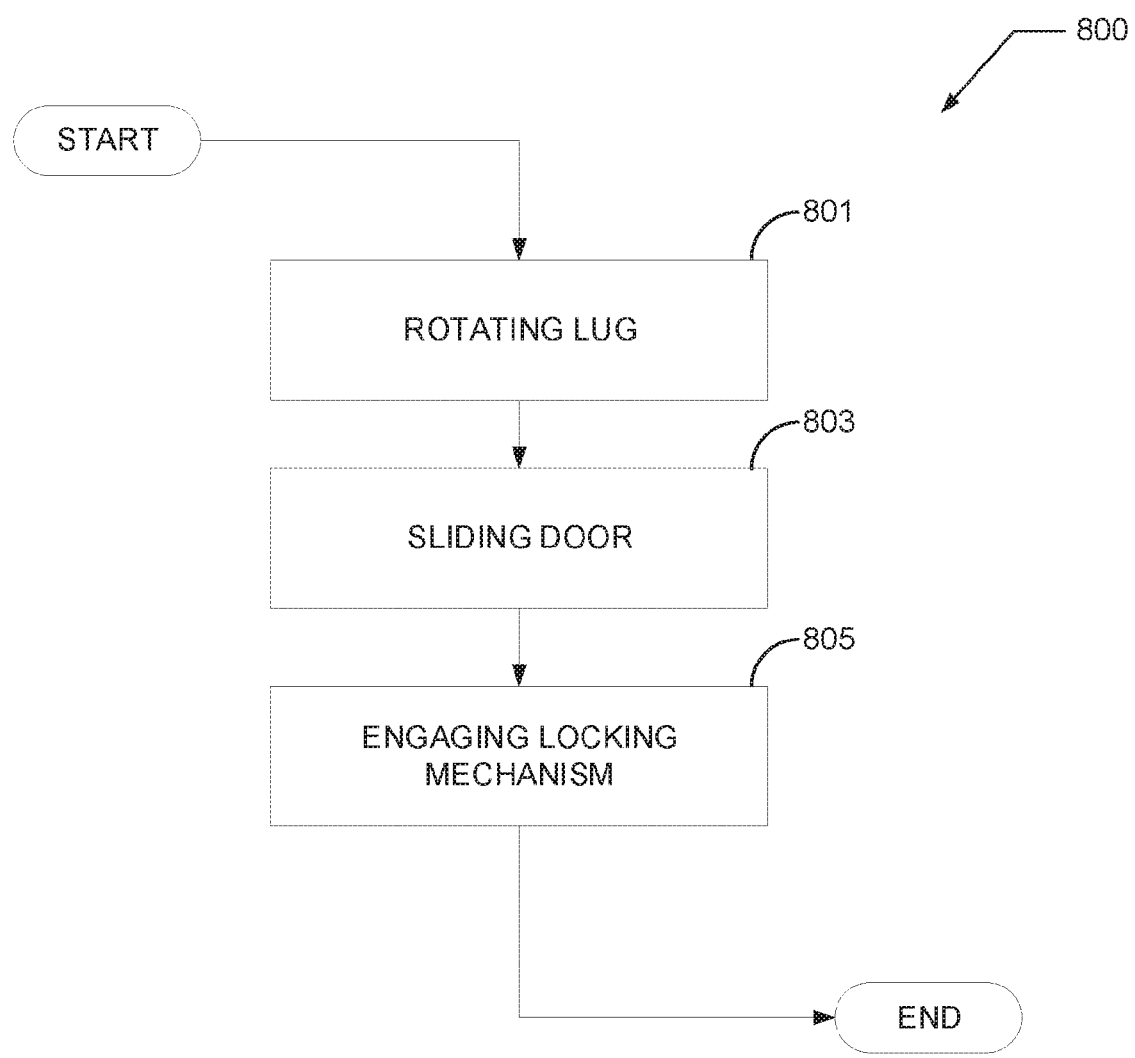
FIG. 8 illustrates a flowchart of an exemplary lug closing process according to one embodiment of the present disclosure.

Referring next to FIGS. 7 and 8, shown are flowcharts that provides examples of the operation of a portion of the lug assembly 100 according to various embodiments. It is understood that the flowcharts of FIGS. 7 and 8 provides merely an example of the many different types of functional arrangements that may be employed to implement the operation of the portions of the lug assembly 100 as described herein. As an alternative, the flowcharts of FIGS. 7 and 8 may be viewed as depicting examples of elements of a method implemented using the lug assembly 100 according to one or more embodiments.

With reference to FIG. 7, shown is a projectile coupling and decoupling process 700 according to various embodiments of the present disclosure. At step 701, the process 700 includes attaching a lug mechanism (e.g., lug assembly 100), as described herein, to a projectile. Attaching the lug mechanism to the projectile can include, but is not limited to: 1) positioning a lug mechanism in an opening of the projectile; 2) inserting, through a first side of the lug mechanism, one or more pins through a plurality of apertures of the lug mechanism such that a lug thereof is substantially rotatable about one of the one or more pins; and 3) pushing, via inserting the one or more pins, one or more retaining pins out of a second side of the lug mechanism (opposite the first side). In some embodiments, rivets, welds, and/or other fixation mechanisms can be used to secure the one or more pins, or otherwise attached the lug mechanism to the projectile.

According to one embodiment, a second lug mechanism can be attached to the projectile, and attaching the second lug mechanism can include, but is not limited to: 1) positioning a second lug mechanism in a second opening of the projectile; 2) inserting, through a first side of the second lug mechanism, one or more second pins through a plurality of second apertures of the second lug mechanism such that, when inserted, the second lug is substantially rotatable about one of the one or more second pins; and 3) pushing, via inserting the one or more second pins, one or more second retaining pins out of a second side of the second lug mechanism (opposite the first side).

At step 703, the process 700 includes configuring the lug mechanism in an open position. Configuring the open position can include, but is not limited to: 1) sliding a door of the lug mechanism, via one or more channels, to an open position such that a frame opening is formed in a frame of the lug mechanism; 2) restricting movement of the door in a direction toward a closed position via a retaining mechanism with the door in a position between the intermediate position and the open position; and 3) rotating the lug about one of the one or more pins through the frame opening to position substantially orthogonal to the frame.

At step 705, the process 700 includes coupling the projectile to the aircraft and configuring the lug mechanism in an intermediate position. Coupling the projectile to the aircraft can include, but is not limited to, connecting a coupling apparatus of the aircraft to the lug of the lug mechanism and, if a second lug mechanism is utilized, connecting a second coupling apparatus of the aircraft to the second lug of the second lug mechanism. The retaining mechanism can be released after the lug mechanisms are coupled to the aircraft. Once the retaining mechanism is released, the door can be free to move toward the closed position but be prevented from reaching the closed position due to the lug being held in an open position because of the coupling. In some embodiments, the coupling apparatus can be a detachable clamp or other mechanism that securely and detachably grips the lug (and second lug). According to one embodiment, at step 705, the lug mechanism is in a locked "safe" mode.

The lug mechanism can be configured into the intermediate position by releasing the retaining mechanism such that the door slides through the one or more channels from the open position (or a position between the open position and the intermediate position) to the intermediate position. In at least one embodiment, in the intermediate position and via one or more tension mechanisms, the door applies a closing force to a side of the lug. The closing force can bias the lug towards rotation about one of the one or more pins from the substantially orthogonal position to a position substantially parallel to the lug mechanism (e.g., where the substantially parallel position also includes the lug being housed fully within the lug mechanism). In one or more embodiments, steps 701, 703 and/or 705 can be steps in an arming process to arm the lug mechanism. According to one embodiment, the arming process includes, but is not limited to, replacing retaining pins with coupling pins (e.g., lug pins or other pins described here) and configuring the lug mechanism into the intermediary position. Following step 705, the aircraft may transport the attached projectile to a predetermined destination, altitude, speed, etc.

At step 707, the process 700 includes deploying the projectile from the aircraft. Deploying the projectile can include, but is not limited to, detaching the coupling apparatus from the lug (and/or detaching the second coupling apparatus from the second lug). By detaching the coupling apparatus from the lug, the projectile is no longer attached to the aircraft and, thus, is deployed therefrom. The projectile may engage one or more propulsion mechanisms to maintain flight. The projectile may also include other mechanisms to steer the projectile in the maintained flight.

Following step 707, the process 700 includes executing a lug closing process 800, as described herein, to reduce a presence of surfaces and protrusions that could compromise the aerodynamic profile of the projectile (e.g., due to generation of frictional forces that cause drag and/or deformation of the lug assembly and projectile).

With reference to FIG. 8, shown is a lug closing process 800 according to various embodiments of the present disclosure. In various embodiments, the process 800 initiates at the moment the coupling apparatus disconnects from the lug. In one or more embodiments, the process 800 can occur within a predetermined closing period selected such that the aerodynamic profile of the projectile is minimally disrupted (e.g., because the presence of surfaces and protrusions are rapidly reduced). For example, the process 800 can occur within a predetermined closing period of about 0.1-0.5 seconds, about 0.1-0.3 seconds, about 0.3-0.5 seconds, or about 0.5-0.7 seconds. In one or more embodiments, the predetermined closing period can be selected by selecting a spring constant (or other factor, such as spring length, etc.) of the one or more springs connected to the door. The aircraft can apply a force on the lug which is greater than a force of the spring. The force from the aircraft can prevent the lug from rotating about the pin. Once the aircraft releases, the force is released and the force of the spring can initiate the lug closing process 800 by push the lug to rotate about the pin.

At step 801, the closing process 800 includes rotating the lug about one of the one or more pins from the substantially orthogonal position (also referred to as a first lug position) to the substantially parallel position (also referred to as a second lug position) such that the lug is housed fully within the lug mechanism and does not protrude or project from the projectile. In some embodiments, the applied closing force of the door causes the lug to rotate about the pin to the substantially parallel position. Upon the lug reaching the substantially parallel position, one or more lug stops (e.g., included in a lug base as described herein) can contact the lug and prevent further rotation thereof.

At step 803, the closing process 800 includes sliding the door through the one or more channels to a closed position such that the door substantially seals the frame opening. As the lug rotates to the substantially parallel position, the one or more tension mechanisms connected to the door draw the door through the one or more channels over the lug and into the frame opening, thereby sealing the frame opening and reducing presence of surfaces and protrusions that could compromise the aerodynamic profile of the projectile. The one or more channels can include sloped regions that transition the door from a first plane inferior to a top surface of the lug mechanism to a second plane substantially coplanar with the top surface of the lug mechanism, thereby providing a substantially streamlined, aerodynamic projectile surface that reduces generation of frictional forces that cause drag and/or deformation of the lug assembly and projectile.

At step 805, the closing process 800 includes engaging a locking mechanism, such as, for example, a locking mechanism 119 (FIG. 1) that includes a first locking component 401 (FIG. 4) and a second locking component 403 (FIG. 4). The engaged locking mechanism prevents movement of the door away from the closed position; therefore, the engaged locking mechanism secures the door such that the frame opening remains substantially sealed and the streamlined, aerodynamic projectile surface is preserved. In some embodiments, the engaged locking mechanism can only be disengaged with a special tool received, for example, in a lock aperture 501 (FIG. 5).

The embodiments were chosen and described in order to explain the principles of the claimed apparatuses and methods and their practical application so as to enable others skilled in the art to utilize the apparatuses and methods and various embodiments and with various modifications as are suited to the particular use contemplated. Alternative embodiments will become apparent to those skilled in the art to which the claimed apparatuses and methods pertain without departing from their spirit and scope. Accordingly, the scope of the claimed apparatuses and methods are defined by the appended claims rather than the foregoing description and the exemplary embodiments described therein.

What is claimed is:

1. An apparatus for attachment of a projectile to a body and release of the projectile from the body comprising:
    a frame comprising a frame body and a frame opening;
    a lug base;
    a lug configured to pivot about a pin in the lug base;
    a door connected to the frame;
    one or more tension mechanisms comprising a first spring end and a second spring end, the first spring end operatively connected to the lug base and the second spring end operatively connected to the door, wherein the one or more tension mechanisms are configured to be more extended when the door is open than when the door is closed; and
    a locking mechanism comprising a pawl and a rack, the pawl operatively connected to the door and the rack operatively connected to the lug base, wherein the locking mechanism is configured to restrict movement of the door in a first direction once the door moves in a second direction past a predetermined point, the first direction being opposite the second direction.

2. The apparatus of claim 1, wherein the lug comprises a first lug portion integrally connected to a first end of a second lug portion and a second end of the second lug portion configured to be coupled to the lug base, the first lug portion comprising a substantially U-shaped body.

3. The apparatus of claim 2, wherein the first lug portion is integrally connected to the first end of the second lug portion at a first end, and a first depth of the first end of the first lug portion exceeds a second depth of a second end of the first lug portion, wherein the first depth and the second depth correspond to an axis perpendicular to the pin in the lug base.

4. The apparatus of claim 2, wherein the second lug portion comprises a substantially half-rectangular body comprising a first leg and a second leg and the lug base comprises a substantially half-rectangular body comprising a third leg and a fourth leg.

5. The apparatus of claim 4, wherein the third leg and fourth leg each comprise a lug stop that determines a maximum rotation of the lug from a first lug position to a second lug position.

6. The apparatus of claim 2, wherein the frame further comprises a first end portion, a second end portion, a first side portion, and a second side portion, a first end portion being operatively connected to a first end of the first side portion and a first end of a second side portion, and the second end portion being operatively coupled to a second end of the first side portion and a second end of the second side portion, wherein the first side portion, the second side portion, the first end portion, and the second end portion comprise the frame opening.

7. The apparatus of claim 1, wherein the door comprises a top surface of the frame that is tangential to the lug when open and substantially seals the frame opening when closed, and further wherein the door is configured to push against and slide over the lug when transitioning from open to closed.

8. The apparatus of claim 1, further comprising:
    a first lug mechanism comprising the frame, the lug base, the lug, the door, and the one or more tension mechanisms; and
    a second lug mechanism comprising a second frame, a second lug base, a second lug, a second door, and a second one or more tension mechanisms, wherein the first lug mechanism is mounted in the projectile in a first direction and the second lug mechanism is mounted in the projectile in a second direction opposite the first direction, wherein the first lug mechanism and the second lug mechanism are configured to provide axial support, and the first lug mechanism is configured to provide the axial support in an opposite direction than the second lug mechanism.

9. An apparatus for coupling a device to an aircraft comprising:
    a door frame comprising a channel;
    a lug base comprising a plurality of apertures configured to fit at least one retaining pin;
    a lug configured to be coupled to the aircraft and to pivot about a pin in the lug base between a first position substantially perpendicular to the door frame and a second position substantially parallel to the door frame;

a door configured to move within the channel of the door frame between an open position and a closed position;

at least one closing mechanism; and a door lock.

10. The apparatus of claim 9, wherein the door lock comprises a first locking component coupled to the door and a second locking component coupled to the lug base.

11. The apparatus of claim 9, wherein the at least one closing mechanism is configured to:

couple to the door at a first end and to the lug base at a second end;

apply a closing force on the door toward the closed position; and cause the door to apply a force to a side surface of the lug based on the closing force, wherein the at least one closing mechanism comprises a pair of closing springs.

12. The apparatus of claim 9, wherein the door is free to move from the open position to an intermediary position when the lug is in the first position and is free to move from the open position to the closed position when the lug is in the second position.

13. The apparatus of claim 12, wherein the intermediary position corresponding to a position of the door when the door is in contact with a side surface of the lug.

14. The apparatus of claim 9, wherein the lug is configured to be held in the first position when coupled to the aircraft and free to move between the first position and the second position when not coupled to the aircraft.

15. The apparatus of claim 10, wherein the second locking component comprises a plurality of ridges configured to catch a ridge of the first locking component to prevent movement in a single direction.

16. The apparatus of claim 15, wherein the single direction corresponds to opening of the door.

17. An apparatus for attachment of a projectile to a body and release of the projectile from the body comprising:

a frame comprising a frame body and a frame opening;

a lug base;

a lug configured to pivot about a pin in the lug base;

a door connected to the frame, wherein the door comprises a top surface of the frame that is tangential to the lug when open and substantially seals the frame opening when closed, and further wherein the door is configured to push against and slide over the lug when transitioning from open to closed;

one or more tension mechanisms comprising a first spring end and a second spring end, the first spring end operatively connected to the lug base and the second spring end operatively connected to the door, wherein the one or more tension mechanisms are configured to be more extended when the door is open than when the door is closed; and a locking mechanism configured to restrict movement of the door in a first direction once the door moves in a second direction past a predetermined point, the first direction being opposite the second direction.

18. The apparatus of claim 17, wherein the locking mechanism comprises a pawl and a rack, the pawl operatively connected to the door and the rack operatively connected to the lug base.

19. The apparatus of claim 17, wherein the door is free to move from an open position to an intermediary position when the lug is in a first position and is free to move from the open position to a closed position when the lug is in a second position.

20. The apparatus of claim 19, wherein the intermediary position corresponding to a position of the door when the door is in contact with a side surface of the lug.

* * * * *